United States Patent Office 3,316,218
Patented Apr. 25, 1967

3,316,218
OXYMETHYLENE COPOLYMERIZATION
PROCESS
Kenneth Vincent Martin, Wilmington, Del., assignor to E. I. du Pont de Nemours and Company, Wilmington, Del., a corporation of Delaware
No Drawing. Filed July 15, 1963, Ser. No. 295,212
3 Claims. (Cl. 260—67)

The present invention deals with an improved polymerization process, and, more particularly, with a process which assures substantially complete mixing of two comonomers prior to copolymerization.

Prior art processes which involve the copolymerization of oxymethylene producing monomers, e.g., formaldehyde or trioxane, with other comonomers have been accomplished by mixing the comonomers in a liquid phase following which catalyst is introduced and polymerization takes place, or by introducing two vapor streams, one containing the oxymethylene generating compound and the other containing the comonomer into a reaction medium containing a suitable solvent or like material and a polymerization initiator, whereupon the vapors copolymerize upon contact with the solvent.

It is an object of the present invention to provide an improved process for copolymerizing oxymethylene producing monomers with other comonomers. Another object of the present invention is to provide an improved process for copolymerizing trioxane with a wide variety of relatively volatile monomers to produce a homogeneous copolymer. Other objects will appear hereinafter.

The above objects are accomplished by vaporizing the oxymethylene producing comonomer such as trioxane, along with a vaporizable comonomer which is chemically different from the oxymethylene producing monomer, and which has a boiling point at atmospheric pressure of less than 300° C. and which will copolymerize with the aforesaid oxymethylene producing monomer. The respective vapors are mixed while maintaining the vapors and resultant mixture under conditions not conducive to copolymerization, i.e., at a temperature greater than about 125° C. After the monomers are thoroughly mixed in the vapor state, a catalyst may be introduced following which the mixture may be copolymerized directly to a solid material or may be copolymerized in a suitable solvent for the resultant copolymer. In the case where trioxane is employed as the oxymethylene producing comonomer, if the catalyst is introduced at the initial portion of the vapor mixing, it is necessary to maintain the vapor temperature above 125° C. while mixing the vapors of trioxane and catalyst with the vapors of the other monomer. When the materials are mixed above 125° C. and a catalyst is added, polymerization can occur when the temperature is less than 125° C., and usually less than 115° C.

One of the difficulties associated with copolymerization is the ability to mix in any desired proportion and in a homogeneous manner, gases, liquids and solids which may comprise the comonomers or catalysts employed in a given process. It has generally been found necessary to intimately disperse these ingredients before the catalyst initiates the reaction. If incomplete mixing is realized, the resultant copolymer will be heterogeneous due to variations in the catalyst concentration and in the molar ratios of comonomers in different areas of the polymerization medium. The prior art has attempted to alleviate this problem, in part, by using catalysts of low activity to provide sufficient time for mixing the respective comonomers and the catalysts before a substantial degree of polymerization is realized. This technique, however, results in reduced reaction rates. The process of the present invention is designed to alleviate the problems experienced in the prior art, and to provide a process which permits copolymerization at higher rates, while producing copolymers having high molecular weights.

The effectiveness of the present process may be determined by inspection of the melting point of the copolymers produced thereby and by measurement of the molecular weight of the copolymers. Melting point is determined according to the general procedure based on ASTM–789–53T, 7D, which is modified to the extent that the polymer is first melted on the melting block and allowed to solidify. This technique reduces the possibility of poor heat transfer between the block and the powdery polymer, since the remelted material is in intimate contact with the heating surface and offers the optimum heat-transfer characteristics between the surface and the polymer. The following procedure was used to prepare the polymers made by the process of the present invention for determination of melting point value. The polymer received from the process, hereinafter termed "crude polymer," was finally divided and 50 parts thereof were thoroughly masticated three times in a Waring Blendor, each time with 100 parts of a 2% aqueous solution of sodium bicarbonate. The polymer was collected, washed with 750 parts of water to remove the sodium bicarbonate and finally washed three times with 250 parts of acetone each time, whereupon the sample was dried in a vacuum oven at 30° C. for twenty-four hours. Approximately five grams of the polymer thus treated was heated to reflux under an atmosphere of nitrogen, with 50 cc. of propionic anhydride containing 1 cc. of quinoline, and after all of the polymer had dissolved the mixture was heated under reflux for an additional ten minutes, and then permitted to cool slowly to room temperature. The solid thus precipitated was collected, blended with 250 cc. of acetone in a Waring Blendor, filtered, washed three times with 250 cc. of acetone each time, and dried in a vacuum oven at 75° C. for approximately six hours. Melting point was determined by placing 10 mg. of the polymer on a Fischer-Johns type hot-block which had previously been preheated to 150° C. The sample was covered with a cover slip under no pressure, and the temperature of the hot-block was increased at the rate of 2 degree/minute until a temperature of approximately 180° C. was reached, whereupon the material was held at this temperature until all of the solids had melted into a fluid mass. The block was permitted to cool slowly to 150° C. at which temperature the polymer usually solidified to an opaque film in intimate contact with the heating block. Immediately after solidification, the temperature of the block was increased at a rate of 1.5° C./minute and the melting of the film was observed as being the temperature at which the opaque film was completely transformed into a clear melt which would flow under the glass cover when very low pressure was applied.

A method for molecular weight determination and for a comparison of the present process with the bulk polymerization processes of the prior art is the measurement of the inherent viscosity (I.V.) of the polymer. This measurement bears a relationship to the weight average molecular weight for most systems. The I.V. is measured by dissolving the 0.125 gram of polymer, which is stabilized according to the process set forth above for determination of melting point, in 25 ml. of reagent grade phenol which has been purified by distillation from solid caustic. The solubility of the polymers prepared by the process of the present invention in phenol at room temperature varies greatly and it is usually necessary to heat the mixture to about 120° C. to increase the rate of solvent and the viscosity of the phenol polymer solution is tion of the copolymer. The viscosity of the phenol sol- measured at 90° C. by noting the times required for the same volume of each material to flow through an Ostwald Viscometer. The I.V. is then determined by using the formula $$I.V. = \frac{2.303 \frac{\text{time of solution}}{\text{time of solvent}}}{\text{grams of polymer}/100 \text{ ml. solution}}$$

The following examples are set forth to illustrate and not to restrict the present invention. Parts and percentages are by weight unless otherwise noted.

Examples 1 to 14

The apparatus which was employed to demonstrate the vapor mixing process of the present invention was a stainless steel cylindrical mixer having a diameter of approximately three inches and a length of approximately twelve inches. The cylindrical mixer was jacketed with a standard heating tape to control the temperature in the mixing device. The oxymethylene producing comonomer was trioxane, while the other comonomer was varied to demonstrate the operability of the present process with a wide variety of materials. The amount of trioxane and the amount and type of comonomer employed is set forth in Table I. Trioxane and the comonomer were introduced in separate nitrogen gas streams into the top of the reactor along with the catalyst also in a nitrogen carrier. The trioxane-nitrogen mixture was obtained by passing nitrogen through a molten solution of trioxane in a stainless steel receptacle following which the mixture was conducted to the top of the jet mixer through a line maintained at a temperature of at least about 130° C. The comonomer was obtained by passing nitrogen through a gas washing tube containing the comonomer in the liquid state, which tube was usually heated by a vapor bath held at approximately 5° C. below the boiling point of the comonomer, whereupon the nitrogen-comonomer mixture was directed to the top of the reactor to contact the incoming trioxane and catalyst. The tube containing the comonomer was graduated in cc. so that the amount of comonomer employed could be read directly from the tube. The resultant gaseous mixture in the upper portion of the mixing device was passed downward therethrough into a stainless steel pot attached to the base of the mixing cylinder. This pot having a volume of about three liters was used to quench the vapors by immersing the pot in a suitable heat-exchange medium, e.g., an ice bath. After the active materials had polymerized, the residual nitrogen gas was bled off through an exhaust port in the aforementioned collection vessel. The apparatus was operated as follows: the heating tapes surrounding the flow lines for the trioxane, comonomer and catalyst as well as the cylindrical mixer were set to achieve a temperature of approximately 130° C. in each line. The trioxane vaporizer was heated to 120° C. to melt the trioxane, and the tube containing the comonomer was then immersed in a vapor bath at a temperature of about 5° below the boiling point of the particular monomer indicated in Table I. The nitrogen was passed through the trioxane at a rate of approximately 400 cc. per minute and through the comonomer at a rate of 50 cc. per minute. At the same instant, a gaseous mixture of 10 moles of nitrogen per mole of boron trifluoride was introduced in the upper area of the jet reactor at the flow rate indicated in Table I. The mixed vapors from the upper portion of the reactor were quenched in the aforementioned stainless steel pot which was immersed in an ice bath at about 0° C. The residence time of the vapors in the jet mixer was of the order of about 1 second for all runs. The indicated amount of solid was collected, washed with water, aqueous sodium bicarbonate, and finally acetone before drying at 70° C. in a vacuum oven for seven hours. In order to demonstrate the completeness of the copolymerization, the polymer was stabilized by refluxing it with acetic anhydride containing small amounts of pyridine according to the general process of United States Patent 2,998,409, issued Aug. 29, 1961, to S. Dal Nogare et al. following which the copolymer was dried, extruded and chopped into pellets following which the melting point and inherent viscosity were determined. These results are set forth in Table I and demonstrate the useful physical properties of the polymers obtained in the present process. In some cases, the base stability of the copolymers was determined as indicated in the table by measuring the mass of the polymer remaining after 10 grams had been heated at 160° C. for one hour in a solution containing 2.5 grams of potassium hydroxide and 150 cc. of benzyl alcohol with the entire mixture being held under nitrogen blanket during heating.

TABLE I

| Example No. | Comonomer | Mass of trioxane, grams | Mass of comonomer, grams | Comonomer/trioxane, molar feed ratio | Mass of product, grams | Time of run, mins. | Catalyst rate, cc./min. | Inherent viscosity of capped product | Melting point of capped product, °C. | Base stability of the uncapped product, percent by weight |
|---|---|---|---|---|---|---|---|---|---|---|
| 1 | Butadiene dioxide | 300 | 4.2 | 90/1 | 156 | 20 | 2.0 | 0.73 | 163-168 | 20 |
| 2 | ___do___ | 1,267 | 3.0 | 700/1 | 600 | 60 | 5 | 1.62 | 169 | 45 |
| 3 | Glycidonitrile | 483 | 7.5 | 160/1 | 240 | 25 | 3-4 | 0.91 | 168 | 15-20 |
| 4 | ___do___ | 1,524 | 10.5 | 400/1 | 1,080 | 90 | 3-4 | 1.124 | | 40 |
| 5 | Ethylglycidylether | 661 | 5.0 | 400/1 | 5 | 30 | 3-5 | 1.25 | 169 | 25 |
| 6 | Glycidaldehyde | 470 | 8.0 | 144/1 | 383 | 27 | 3-12 | 1.19 | 163 | 90 |
| 7 | ___do___ | 1,014 | 18.0 | 120/1 | 850 | 60 | 10 | | | 65 |
| 8 | Ethylglycidate | 150 | 5 | 40/1 | 100 | 15 | 4-5 | 1.06 | 168 | 34 |
| 9 | ___do___ | 1,300 | 18 | 93/1 | 1,220 | 60 | 4-7 | 0.98 | | 30 |
| 10 | Methylglycidate | 150 | 3.0 | 57/1 | 125 | 60 | 8 | 0.80 | | 30 |
| 11 | ___do___ | 100 | 4 | 27/1 | 50 | 60 | 6 | 0.85 | | 44 |
| 12 | ___do___ | 870 | 33 | 30/1 | 770 | 60 | 3.5 | 1.0 | | 53 |
| 13 | Ethylene oxide | 195 | 1.5 | 70/1 | 210 | 20 | 15 | 0.51 | 176-177 | 50 |
| 14 | Propylene oxide | 500 | 7 | 70/1 | 345 | 20 | 3 | 0.63 | 163 | 70 |

In order to demonstrate some of the advantages of the present process over the standard types of bulk polymerization, the following examples are presented.

Example 15

Bulk polymerization was accomplished by placing 78 grams of trioxane which had been distilled from sodium and 1.6 grams of propylene oxide comonomer in a test tube having a volume of approximately 50 cc. and immersed in an oil bath at 65° C. Nitrogen was introduced into the molten material at the rate of approximately 2 cc. per minute. The catalyst ($BF_3$) was bubbled into the solution as a gaseous mixture of 1 part by volume of boron trifluoride to 10 parts of nitrogen for a total volume of approximately 54 cc. After approximately two minutes, the solution became cloudy and polymer began to precipitate. When the polymerization was completed, the temperature was approximately 75° C. and the copolymer was removed from the test tube, reduced to a fine powder by chopping in a Waring Blendor in the presence of an aqueous solution of sodium bicarbonate, washed with 750 cc. of water to remove the sodium bicarbonate, and finally washed three times with 250 cc. of acetone each time, following which the powdery material was dried in a vacuum oven. This copolymer was stabilized according to the same process and applied to the polymers of Examples 1 to 14.

The copolymer remaining after treatment with a basic compound as described above (59% of the original product) had a propylene oxide content of 0.67 mole percent and an inherent viscosity of 0.52.

*Example 16*

The copolymerization was repeated according to the process of Examples 1 to 14 employing trioxane, propylene oxide and boron trifluoride in identical feed ratios to those employed in Example 15. It was noted that copolymerization occurred practically instantaneously when the gaseous mixture was quenched. The copolymer was refined in the same manner as employed in Example 15. The fraction which was stable to base treatment (60% of the total copolymer) had a propylene oxide content of 0.82 mole percent and an inherent viscosity of 1.04.

It should be apparent from the above examples that the process of the present invention produces homogeneous copolymers at a higher rate and with a markedly higher molecular weight than a bulk polymerization. If the amount of catalyst in a bulk polymerization medium as shown in Example 15 is reduced, the reaction time is increased beyond fifteen minutes, as is the case in which the bulk system is held at 0° C. instead of permitting the exothermic polymerization to increase the temperature of the medium as in Example 15. Reducing the temperature of the bulk system to 0° C. after commencement of the copolymerization also fails to increase the molecular weight of the polymer.

Although the examples presented show the polymerization of trioxane with boron trifluoride as a catalyst, it should be noted that other oxymethylene producing materials, e.g., formaldehyde, are polymerizable in the process of the present invention, and other volatile polymerization catalysts are useful in the process, e.g., the protonic acids, such as hydrogen fluoride, hydrogen chloride, etc., the volatile Lewis acids, usually the Friedel-Crafts metal halides, such as aluminum trifluoride, tin tetrachloride, ferric chloride, cobalt dibromide, stannous chloride, and stannous fluoride; and the volatile salts of strong acids (those acids having a pK less than 2.0) with weak bases. Also operable as catalysts in the present process are certain complexes of the aforementioned metal halides. Compounds which will complex with these metal halides include tertiary amines and ethers, e.g., trimethylamine, dimethylamine, dimethylstearylamine, dimethylcyclohexylamine, dimethyl ether, dibutyl ether, and dipropyl ether.

The foregoing examples show the use of nitrogen as the inert diluent gas; however, one skilled in the art will appreciate that other gases such as carbon dioxide may be used as diluents in the present process. The foregoing examples also show a process which mixes the comonomers and the catalysts in the gaseous phase and polymerizes the comonomer to a solid by quenching the heated vapors. Premature polymerization is avoided by maintaining the comonomer mixture and catalyst above 125° C. Other modifications should be apparent to those skilled in the art, e.g., a suitable solvent or nonsolvent may be employed as the polymerization medium and a mixture of comonomers and catalyst may be polymerized in such a medium. The comonomer mixture exclusive of catalyst may be directed into such a liquid medium wherein the catalyst has been previously dispersed. The selection of a particular solvent is not critical in the practice of the present invention so long as the solvent selected does not degrade the polymer.

It should be apparent from the data in Table I and Example 16 that the polymer prepared according to the process of the present invention may be extruded or injection molded into a variety of useful shaped materials, such as films, bristles, filaments, tubes and the like. It should also be apparent that the process of the present invention permits the employment of relatively minor amounts of comonomer in a copolymer to yield marked decrease in melting point for easier processibility of the copolymer.

I claim:

1. A process for copolymerizing an oxymethylene producing monomer and another vaporizable monomer having a boiling point of less than 300° C. which is chemically different from said oxymethylene producing monomer, which process comprises vaporizing each of said monomers, mixing the vapors thus obtained while maintaining the vapors above about 125° C., the maximum temperature at which said vapors will copolymerize, contacting said vapors with a copolymerization catalyst, and thereafter copolymerizing the mixed monomers at a reduced temperature.

2. A process for the copolymerization of trioxane and another vaporizable comonomer having a boiling point less than 300° C. which is chemically different from trioxane, which process comprises vaporizing said trioxane and said vaporizable comonomer, mixing the comonomers thus vaporized while maintaining the temperature of the vapors above about 125° C., contacting said vapors with a copolymerization catalyst, and thereafter copolymerizing said monomers at a temperature less than about 115° C.

3. A process for the copolymerization of trioxane and another vaporizable comonomer having a boiling point below 300° C. which is chemically different from said trioxane, which process comprises vaporizing said trioxane and said vaporizable comonomer, mixing the vapors at a temperature of from 125 to 350° C., contacting the resultant mixture with a copolymerization catalyst, and thereafter condensing the vapor catalyst mixture and copolymerizing the condensate at a temperature less than about 115° C.

References Cited by the Examiner
UNITED STATES PATENTS

| | | | |
|---|---|---|---|
| 2,795,571 | 6/1957 | Schneider | 260—67 |
| 3,115,480 | 12/1963 | Steadman et al. | 260—67 |

SAMUEL H. BLECH, *Primary Examiner.*

WILLIAM H. SHORT, *Examiner.*

L. M. MILLER, *Assistant Examiner.*